Feb. 6, 1940.   A. A. BRODEUR   2,189,484
APPARATUS FOR CLEANING POULTRY AND THE LIKE
Filed March 7, 1938   2 Sheets-Sheet 1
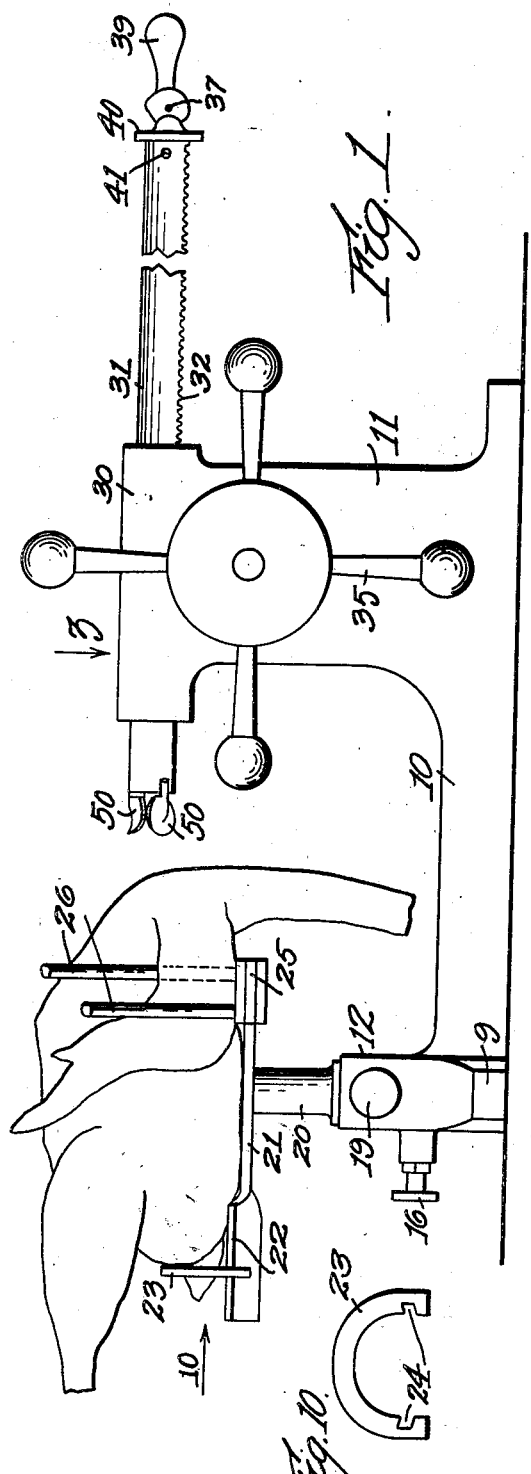
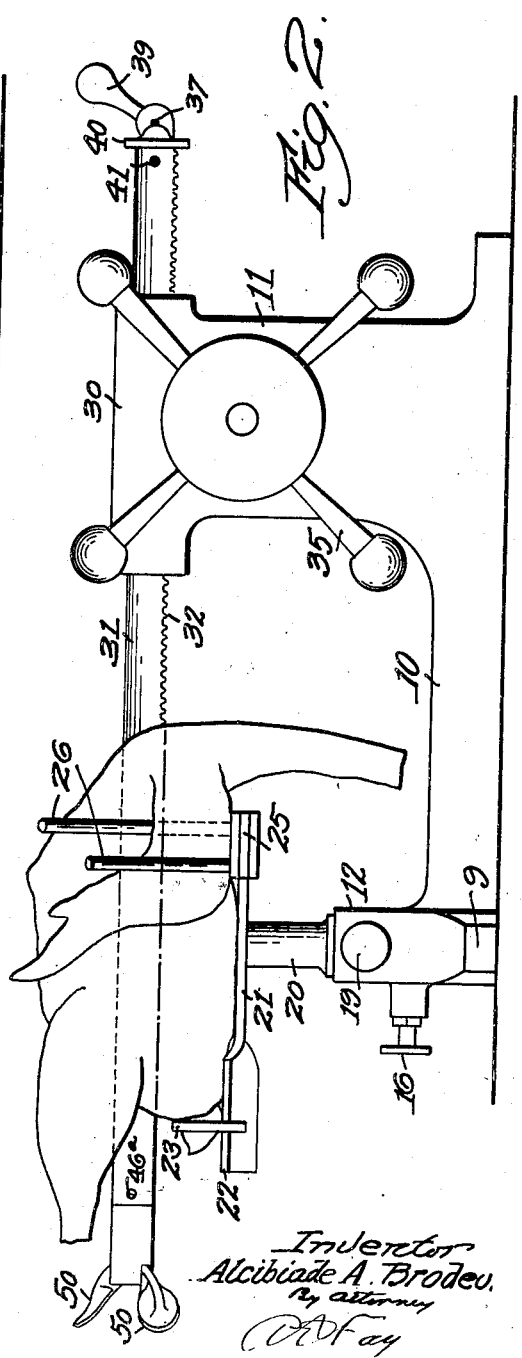
Inventor
Alcibiade A. Brodeu,
by attorney
O. D. Fay Feb. 6, 1940.  A. A. BRODEUR  2,189,484
APPARATUS FOR CLEANING POULTRY AND THE LIKE
Filed March 7, 1938  2 Sheets-Sheet 2
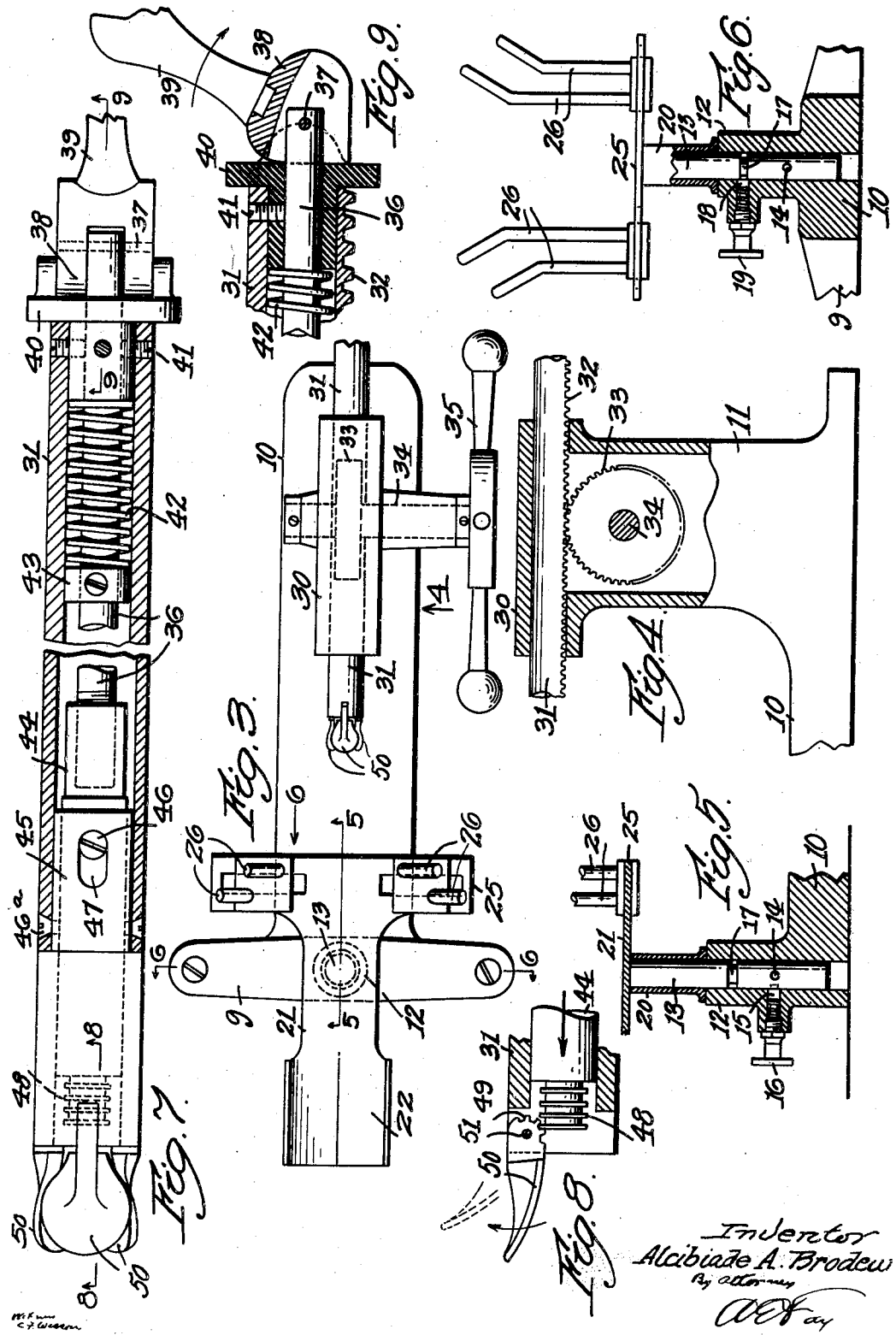

Patented Feb. 6, 1940

REISSUED
DEC 23 1941

2,189,484

UNITED STATES PATENT OFFICE 2,189,484

APPARATUS FOR CLEANING POULTRY AND THE LIKE

Alcibiade A. Brodeur, Worcester, Mass.

Application March 7, 1938, Serial No. 194,343

8 Claims. (Cl. 17—11)

The principal objects of this invention are to provide means by which the insides of a chicken, turkey, or the like, can be cleaned out mechanically so that the insides will come out clean and whole; to provide means for entering a cleaning tool through a slit made below the neck portion and passing it entirely through the body, taking with it all of the insides or viscera of the poultry, or the like, and depositing them in a whole condition in a receptacle for that purpose; to provide a stand on which the carcass of the poultry, game, or the like, can be held firmly while being cleaned; to provide a tube adapted to be projected through the inside and means for so moving it; to provide a handle connected therewith adapted to be held in two positions, in one of which a set of arms at the end of the tube are held in closed position and in the other of which they are opened out to perform the function of removing the insides; to provide means whereby the holding device can be lifted and a larger carcass put in place; to provide a stop at the back of the instrument against which the rear end of the body portion of the chicken, or the like, being cleaned, will come, to hold the carcass from sliding back under the operation of the diverging arms; and to provide on the support for the body of the chicken, or the like, means for holding the wings and therefore preventing the shifting of the carcass which is held thereon and which is to be cleaned out.

Other objects and advantages of the invention will appear hereinafter.

Reference is to be had to the accompanying drawings, in which

Fig. 1 is a side view of a preferred embodiment of this invention, shown in a position in which it is ready for the first operation to commence on the carcass of the poultry, or the like;

Fig. 2 is a similar view showing the end of the operation;

Fig. 3 is a plan of the device in the position shown in Fig. 1 and without the carcass to be operated on;

Fig. 4 is a side view, taken in the direction of the arrow 4 in Fig. 3, showing the upper part in sectional view along the central line of Fig. 3;

Fig. 5 is a sectional view on the line 5—5 of Fig. 3;

Fig. 6 is an end view of the carcass holding device, looking in the direction of the arrow 6 in Fig. 3, with parts in section on the line 6—6 of Fig. 3;

Fig. 7 is a plan of the operating plunger with parts in horizontal section;

Fig. 8 is a sectional view on the line 8—8 of Fig. 7;

Fig. 9 is a sectional view on the line 9—9 of Fig. 7; and

Fig. 10 is an end view of the stop.

This device relates to an apparatus for cleaning out the insides of poultry, game, birds, or the like, in a clean and whole condition. It is intended for use in markets to eliminate the manner now used of cleaning them with the hands, insure the deposition of the debris always in the same spot, and insure cleanliness.

The instrument comprises essentially a base 10 to rest on a counter or table in a retail meat store. An upright 11, preferably integral with the base, extends upwardly at one end of the base and a vertical member 12 at the other end of the base. The base is shown with feet 9 for steadying it.

In the vertical member 12 is mounted a vertical cylindrical shaft 13 and it is capable of moving up and down and turning in a cylindrical recess in the member 12 in which it is located. The shaft is provided with a circular horizontal series of notches 14. A spring pressed plunger 15, operated by a hand knob 16, is arranged to hold it with respect to any one of these notches. Above the notches is a complete cylindrical groove 17 adapted to receive another spring pressed plunger 18 operated by a hand knob 19. This holds the shaft in a certain vertical position and allows it to turn freely in any position desired, the purpose of which will be described later. The plunger 15 holds it against both vertical and circumferential motion. The shaft 13 fits into, and is secured to, a hollow boss 20 on the bottom of a platform 21. This platform is to receive the carcass of poultry, such as a chicken, turkey, or the like, which is to be cleaned. The platform 21 extends longitudinally and is provided with side edges 22 which diverge outwardly and upwardly. Carried adjustably by these side edges is a stop 23 which is shown as semi-cylindrical and provided with opposite inner notches 24 for receiving the edges 22 and holding the stop in any position to which it is adjusted by hand. As will be seen later, the carcass to be operated upon is placed near this stop and the operation for cleaning it will bring the end against this stop and the stop will limit its motion backwardly on the platform 21.

Also mounted on the extension 25 on the other end of this support 21 are upwardly but inclined pins 26 for holding the wings of a chicken, or the like, as indicated in Fig. 1 and preventing the forward motion of the carcass. The supporting platform can be turned to a sidewise position to permit the placing of the carcass thereon, the adjustment of the wings, and the cutting of the flesh to make adequate openings in the carcass at the front and rear.

The upright 11 is provided with an integral hollow horizontal guide 30. This guide receives and controls the direction of motion of a cylindrical plunger 31. This plunger is provided with a horizontal rack 32 on the bottom through which it is operated. Meshing with and driving the rack is a gear 33 fixed on a transverse shaft 34 mounted on the upright 11. The shaft is turned by a hand wheel 35 thereon to move the plunger back and forth in a horizontal path. This plunger projects beyond both ends of the guide 30 and is provided inside with a relatively movable rod 36. The end of the rod 36 projects out beyond the plunger and is provided with a cross pin 37. On this pin is pivoted a cam shaped member 38 which is fixed to, and constitutes a part of, an oscillatable handle 39.

When the parts are in the position shown in Fig. 9, it is obvious that the rod 36 is as far to the left as it can go. This handle, when turned around in the direction of the arrow into a position in alignment with the rod 36, will pull that rod back to the right as far as it will go. The end of the plunger is closed by a flanged collar 40 which is held in fixed position by a set screw 41. Beyond this collar inside is a compression spring 42 engaging the collar and surrounding the rod 36. This spring engages another collar 43 fixed to the rod 36 so that the spring, acting against the stationary collar 40 tends to push the rod 36 to the left. This rod 36 is screwed into a slide 44, in a hollow guide 45 fixed in the plunger by screws 46a.

The slide 44 has a radial screwhead or pin 46 projecting through an elongated opening 47 in the guide 45 to limit the motion in two directions. This guide 45 is really a part of the plunger 31. At the end of the slide 44 is a circular rack 48 formed of a series of circumferential teeth. When this slide 44 is forced to the left, as shown by the arrow in Fig. 8, the teeth come into contact with the teeth of a segmental rack 49. A plurality of these racks 49 are arranged around the device and each one is provided with an arm 50. The arms are pivoted on tangential pins 51. The movement of the slide 44, as shown in Fig. 8, throws all these arms 50 outwardly, as shown in Fig. 2, and in dotted lines in Fig. 8. In this position, these arms, having been pushed from the position shown in Fig. 1 into an opening formed in the front of the breast of the carcass below the neck portion, will be in position after they get inside with the arms closed, as shown in Fig. 1, to be opened.

The operation consists in moving the handle from the position shown in Fig. 1 to that shown in Fig. 9 and also in Fig. 2. In this position the shaped end on the handle allows the spring 42 to move the arms outwardly to the position shown in Fig. 2 and in dotted lines in Fig. 8. Three of these arms are shown in the present instance and they, being turned outwardly as just described, just after they enter the carcass, will serve to push the insides out of the carcass without breaking them up and push them through the opening at the rear, which has previously been cut out. The viscera from a succession of carcasses will be deposited in one spot beyond, but below, the platform 21.

It will be found that, whether applied to frozen poultry, game, or the like, or to freshly killed ones, the insides are very easily pushed out in this way and without tearing and separating them. By this machine the poultry, game, or the like, are thoroughly cleaned of the waste matter and are ready to be sold after being flushed out with water to the retail trade. The support 21 is adapted to be turned on a vertical axis by the releasing of the thumb button 16. Then the front and rear of the body portion can be brought to either side for the trimming cut of a hole in the front and rear by a knife, or in any other suitable manner, to facilitate this process. Then the support is moved back to longitudinal position and the pin 13 merely inserted by letting go of the button 16. The operation of the cleaning is performed simply in the manner above described with very little manipulation and without the necessity of employing anybody highly skilled. The platform 21 can be set to at least two different heights as shown, for a small or large carcass, such as a chicken, turkey, or the like, and is easily adjustable. In this way the carcasses are thoroughly cleaned in a minimum of time.

Having thus described my invention and the advantages thereof, I do not wish to be limited to the details herein disclosed, otherwise than as set forth in the claims, but what I claim is:

1. The combination with a support for a carcass, of a plunger, means for guiding the end of the plunger into a carcass on said support, arms movably mounted on said means for guiding said plunger, means for moving said arms outwardly operated by said plunger, to enable them to engage the insides and remove them from the carcass, and means for pushing the plunger all the way through the carcass.

2. In a device for cleaning out the insides of carcasses of poultry, game, or the like, and leaving the viscera beyond the tail of the carcass, the combination with a base, a support for the carcass on said support, of a plunger supported by said base and adapted to be moved all the way through the carcass from end to end, arms movably mounted with respect to the plunger, means for moving the plunger into a carcass on said support, and means for moving the arms outwardly while inside the carcass.

3. In a device for cleaning out the insides of poultry, or the like, and leaving the viscera beyond the tail of the carcass, the combination of a base, a support mounted on said base for receiving the carcass to be cleaned, an upright on the base, a plunger mounted to reciprocate on said upright, means for reciprocating the plunger, arms pivotally mounted on pivots near the end of the plunger for moving with the plunger and engaging the front part of the removable contents in the inside of said carcass, and means for swinging said arms about their pivots outwardly after they have entered said carcass.

4. In a device for cleaning out the insides of poultry, or the like, and leaving the viscera beyond the tail of the carcass, the combination of a base, a support mounted on said base for receiving the carcass to be cleaned, an upright on said base spaced from said support, a plunger mounted on said upright to reciprocate, means for reciprocating the plunger, arms pivotally mounted near the end of the plunger for engaging the front part of the removable contents in the inside of said carcass, and means for swinging said arms about their pivots outwardly after they have entered said carcass, whereby the motion of the plunger clear through said carcass, from the front to the rear and out at the rear thereof, will remove the said contents.

5. In a device of the character described, the combination of a base, a support carried thereby for the body of the poultry, game, or the like, to be cleaned, a horizontal guide mounted on said base at a suitable level with respect to the body on said support to be cleaned, a plunger mounted on said guide to move horizontally, a handle on the end of said plunger, a rod in the plunger to which said handle is pivoted, a collar fixed to the end of the plunger, a cam fixed with respect to the handle for engaging said collar for moving the rod, said rod having a circular rack thereon, arms pivoted on the plunger, each having a segmental pinion meshing with said rack, whereby the turning of the handle from one position to another will move the rod longitudinally and open said arms.

6. In a device of the character described, the combination of a base, a support carried thereby for the body of poultry, game, or the like, to be cleaned, a horizontal hollow guide mounted on said base, a plunger mounted in said guide to move horizontally, pivoted arms near the end of said plunger nearest the body of the poultry, a rod connected with the arms and having a circular rack thereon, each arm having a segmental pinion meshing with said rack, whereby the longitudinal motion of the plunger from one position to another will open said arms, and means for moving said rod longitudinally with respect to the plunger.

7. In a device of the character described, the combination of a support comprising a horizontal plate for receiving the carcass of a chicken, or the like, to be cleaned, a plunger adapted to enter said carcass from the front and to be pushed all the way through the carcass for removing the insides, and leaving them at the rear of the carcass, and a stop plate on said support at the rear thereof for engaging the rear of the carcass and preventing its moving backwards.

8. A device of the character described comprising a support for a chicken, or the like, to be cleaned, means for preventing the movement of the chicken, or the like, forwardly on the support, pins projecting up from the support for holding front sides of the wings of said chicken, or the like, and a plunger adapted to be moved into and all the way through the inside of the body of the chicken, or the like, to clean it out.

ALCIBIADE A. BRODEUR.